May 21, 1935.  R. B. HITE  2,002,396
GRASS TRIMMER
Filed Jan. 15, 1934   2 Sheets—Sheet 1
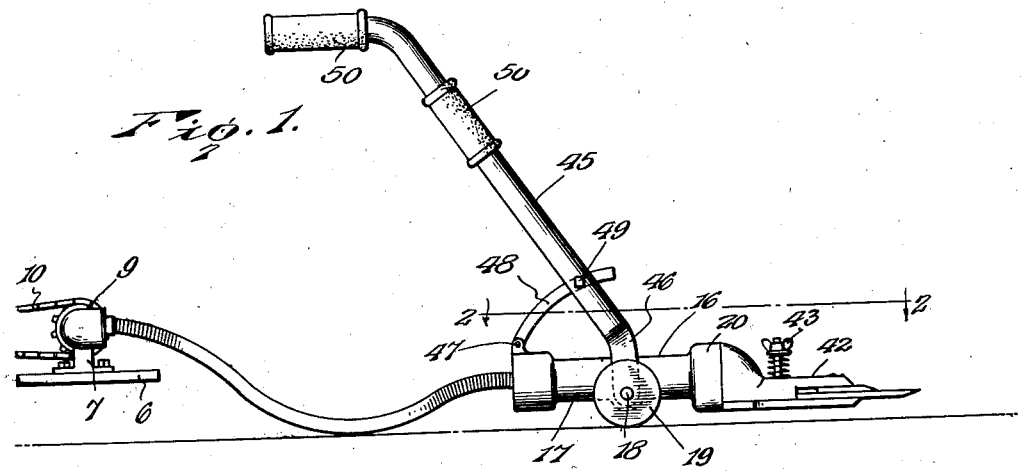
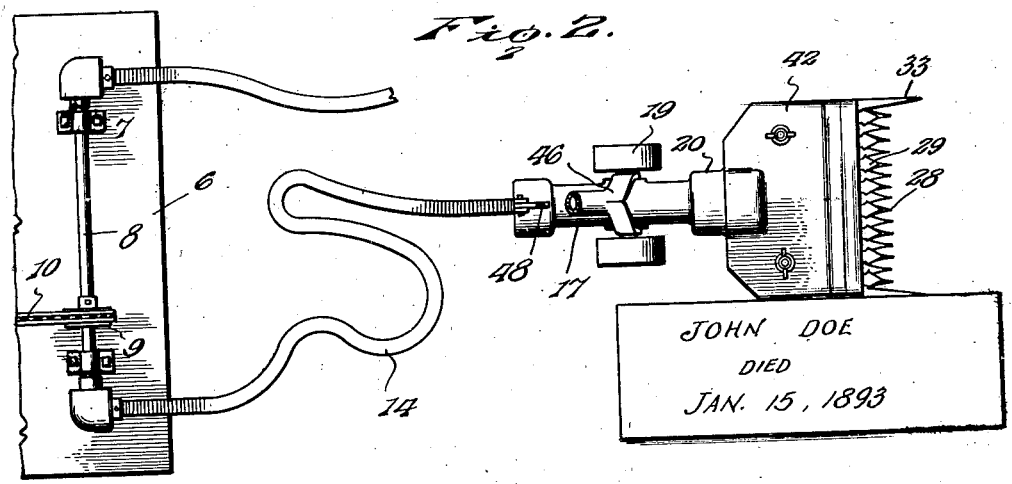
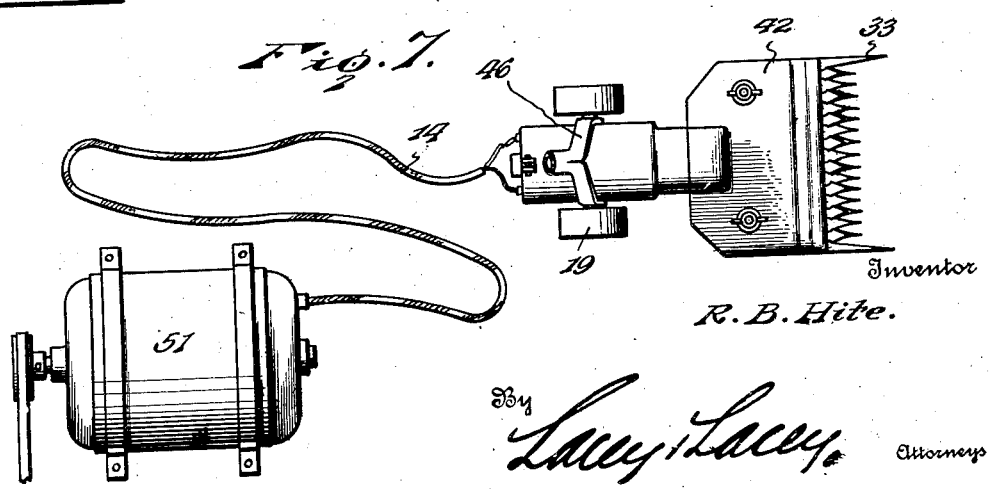
Inventor
R. B. Hite.
By Lacey & Lacey, Attorneys May 21, 1935.   R. B. HITE   2,002,396
GRASS TRIMMER
Filed Jan. 15, 1934    2 Sheets-Sheet 2
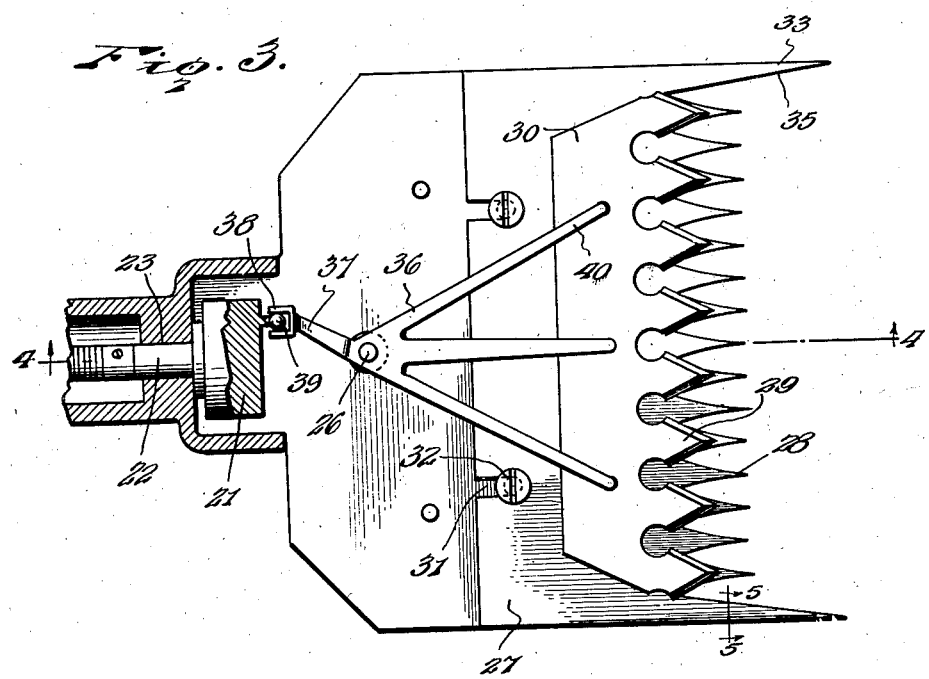
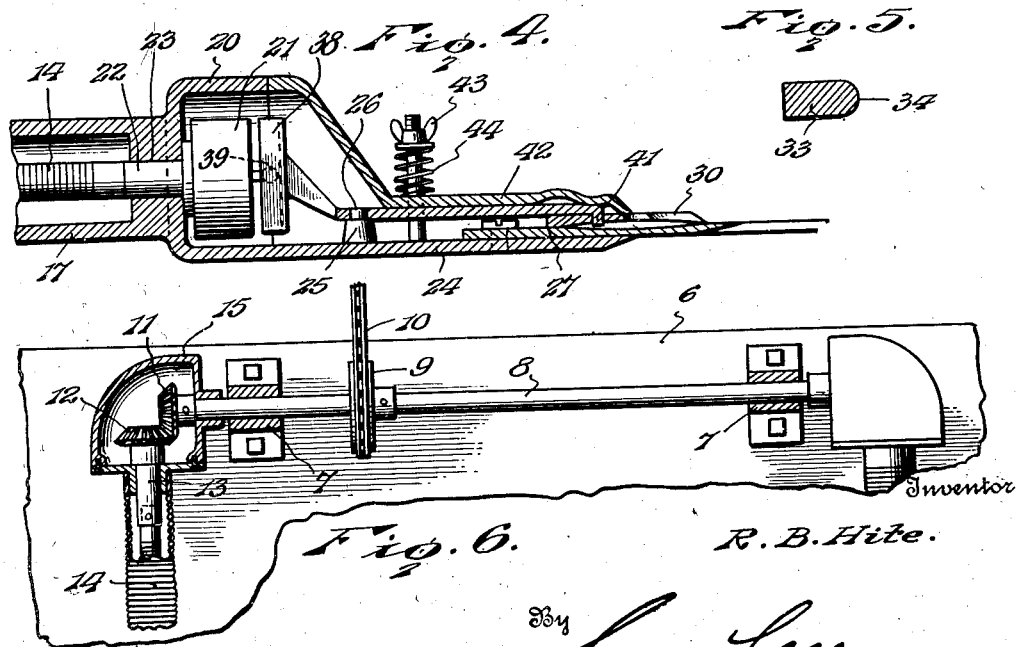
Inventor
R. B. Hite.
By Lacey & Lacey, Attorneys Patented May 21, 1935

2,002,396

UNITED STATES PATENT OFFICE 2,002,396

GRASS TRIMMER

Rollie B. Hite, Nevada, Ohio

Application January 15, 1934, Serial No. 706,755

6 Claims. (Cl. 56—25)

This invention relates to grass trimmers and has for its object to provide a comparatively simple and thoroughly efficient device of this character especially designed for use in cemeteries and the like for cutting and trimming grass growing around gravestones, identifying slabs, curbing and other objects where the grass is usually difficult, if not impossible, to cut with the ordinary mower.

A further object of the invention is to provide means whereby one or more grass trimmers may be readily attached to and driven from a power mower so that it is only necessary for the operator to guide the trimmer or trimmers in order to effect cutting of the grass.

A further object is to mount the cutter head on a wheeled carriage or truck and to pivotally support the operating handle of the trimmer on the wheels of the carriage whereby to permit said handle to be adjusted to any desired angle or inclination with respect to the cutting head to suit the convenience of the operator.

A further object is to provide the lower plate or comb of the cutter head with oppositely disposed guide fingers which project longitudinally beyond the cutting teeth and form guides for the cutter when trimming around slabs and also serve to direct blades of grass growing close to the slab laterally in the direction of the cutting teeth.

A still further object of the invention is generally to improve this class of devices so as to increase their utility, durability and efficiency.

In the accompanying drawings forming a part of this specification, Figure 1 is a side elevation of a grass trimmer embodying the present invention, showing the same connected with and operated from a power driven mower, Figure 2 is a top plan view, partly in section, of Figure 1.

Figure 3 is an enlarged top plan view of the cutter head with the cover plate removed and showing the forward portion of the carriage housing in section, Figure 4 is a transverse sectional view taken on the line 4—4 of Figure 3.

Figure 5 is a transverse sectional view taken on the line 5—5 of Figure 3,

Figure 6 is a top plan view, partly in section, showing the manner of connecting the flexible shaft with the power shaft of the mower, Figure 7 is a top plan view illustrating a modified form of the invention.

Similar numerals of reference indicate corresponding parts in all the figures of the drawings.

The improved grass trimmer, forming the subject-matter of the present invention, may be driven from any suitable source of power and by way of illustration is shown in connection with a power mower of conventional construction in which 6 designates the platform provided with upstanding bearings 7 in which is journaled a power shaft indicated at 8, there being a sprocket wheel 9 keyed to the power shaft and having a sprocket chain 10 extending thereover and leading to the engine or motor of the mower, not shown.

Bevel gears 11 are secured to the opposite ends of the power shaft 8 and mesh with corresponding bevel gears 12 provided with hubs 13 to which are secured the adjacent ends of flexible shafts 14, the bevel gears 11 and 12 being preferably encased in a suitable housing 15 to prevent dirt and other foreign matter from gaining access thereto and interfering with the operation thereof.

The grass trimmer comprises a carriage 16, the body portion 17 of which is preferably in the form of a cylindrical casing, as shown, and secured to the bottom of the casing is a transverse axle 18 having wheels 19 mounted thereon by means of which the carriage may be conveniently moved from place to place in the act of cutting grass. The forward end of the casing 17 is provided with a cylindrical enlargement 20 in which is mounted for rotation a wheel 21 and secured to said wheel is a stub shaft 22 journaled in suitable bearings 23 formed in the casing and operatively connected with the adjacent end of the flexible shafting 14 whereby motion will be transmitted from the power shaft 8 to the wheel 21 to rotate the latter. The front end of the casing is stepped or offset and provided with a longitudinally disposed plate 24 constituting the base of the cutter head, said plate being provided with an upstanding stud 25, the terminal of which is reduced to form a pivot pin 26. Mounted on the plate 24 is a stationary cutter bar 27, the upper face of which is slightly concave, said bar being provided with terminal teeth 28 which coact with cutting teeth 29 formed on a reciprocating cutter bar 30, the lower face of which is slightly concave, as shown. The stationary cutter bar 27 is formed with slots 31 opening through the rear end of the plate and in which are fitted screws 32 threaded into the plate 24 and by means of which the plate 24 may be adjusted longitudinally of the cutter head if desired. The opposite side edges of the stationary cutter bar 27 are extended longitudinally beyond the teeth 28 to form guide fingers 33 which tend to elevate the blades of grass and direct said grass to the cutting mechanism. The outer faces of the guide fingers 33 are parallel and preferably rounded at 34 so as to permit said guide fingers to bear against the lower edge of a tombstone or identifying slab without injury to the slab and, at the same time, direct the grass to the cutting mechanism so that grass growing around and close to an identifying slab may be readily cut without using hand shears or clippers for this purpose. The inner faces of the guide fingers 33 are preferably inclined or tapered in the direction of their free ends, as indicated at 35, to assist in guiding the grass to the cutting mechanism.

Pivotally mounted on the pin 26 is a forked actuating member 36, one end of which is provided with an extension 37 terminating in a vertically disposed channel bar 38 which receives a spherical head 39 projecting laterally from the member 21, the opposite end of the forked member being provided with spaced fingers 40 having depending lugs 41 which fit in correspondingly shaped openings in the reciprocating cutter bar 30 so that, as the member 21 is revolved, a reciprocating movement will be imparted to the cutter bar 30. The cutter head is preferably provided with a cover in the form of a tension plate 42 held in place by a nut 43, there being a spring 44 interposed between the nut and cover plate for holding said plate in position on the cutter head. The plate 42 bears against the fingers 40 and serves to hold the lugs 41 in their seats and also exerts a tension on the cutter bar 30. The carriage is provided with an operating handle 45, the lower end of which is bifurcated at 46 and pivotally mounted on the axle 18. Pivotally mounted at 47 on the carriage casing 17 is an arcuate bar or quadrant 48 which extends through a slot in the lower portion of the operating handle and forms a guide for the handle so as to permit said handle to be adjusted at any angle or inclination to suit the convenience of the operator, said handle being secured in position by a bolt 49 extending through the handle and clamping the arcuate bar 48, as best shown in Figure 1 of the drawings. It will thus be seen that motion will be transmitted from the power shaft 8 of the mower through the medium of the flexible shaft 14 to the cam wheel 21 and as the cam wheel 21 revolves the cutter bar 30 will reciprocate and cut the grass as the cutter head is moved over the lawn. The handle 45 is preferably provided with one or more hand grips 50.

In using the device the guide fingers 33 are positioned against the face of a tombstone, slab, or other object and the trimmer moved longitudinally parallel therewith, as best shown in Figure 2 of the drawings. As the trimmer moves along the face of the slab, the grass growing in proximity to the slab will be deflected laterally by the guide fingers into the path of the cutter teeth, the curved outer edges of the fingers 33 forming a guide for the cutter head, as will be understood.

Instead of connecting the cutter head with a power mower, an electric motor may be mounted on the cutter head and an electric conductor 14 may be connected therewith and to an electric generator 51, or to any other suitable source of power, as best shown in Figure 7 of the drawings.

While I have shown two grass trimmers connected with and operable from a power mower, it will, of course, be understood that as many grass trimmers may be employed as may be found desirable or necessary. It will thus be seen that there has been provided an extremely simple and compact grass trimmer which may be manufactured at a relatively small cost and which will effectually perform the functions for which it is designed.

Having thus described the invention, I claim:

1. The combination with a mower having a power shaft, of a grass trimmer including a casing, an axle extending transversely of the center of the casing, wheels mounted on the axle, a cutter head carried by the casing, guide fingers disposed on opposite sides of the cutter head and extending longitudinally beyond the same, a handle pivotally mounted on the axle, a quadrant pivotally connected with the casing at the rear of the handle and extending through a slot in the handle, means engaging the quadrant for holding the handle in adjusted position, and a flexible cable forming a connection between the cutter head and power shaft for transmitting motion from one to the other.

2. In a grass trimmer, a carriage including a casing having a plate at one end thereof, an axle secured to and extending transversely of the intermediate portion of the casing, wheels mounted on the ends of the axle, a stationary cutting member mounted on the plate and provided with oppositely disposed guide fingers, a reciprocating cutting member mounted on the stationary cutting member, a shaft journaled in the casing, a crank disk secured to one end of said shaft, a connection between the reciprocating cutter and crank disk, and means operatively connected with the shaft for rotating said shaft.

3. In a grass trimmer, a carriage including a casing having one end thereof provided with an enlargement terminating in a longitudinally disposed plate, an axle secured to and extending transversely of the casing at approximately the center thereof, wheels mounted on the axle, a longitudinal shaft journaled in the casing, a crank disk secured to one end of the longitudinal shaft and mounted for rotation in the enlargement, a stationary cutting element secured to the plate, a reciprocating cutting element coacting with the stationary cutting element, an actuating member pivotally mounted on the plate and operatively connected with the reciprocating cutting element and said crank disk, a cover plate fitting over the reciprocating element and actuating member, means for yieldably holding the cover plate in closed position, and means for rotating the longitudinal shaft.

4. In a grass trimmer, a carriage including a casing having one end thereof offset and provided with a cylindrical enlargement terminating in a longitudinally disposed plate, an axle secured to and extending transversely of the casing at the center thereof, wheels mounted on the axle, a longitudinal shaft journaled in the casing, relatively stationary and movable cutting elements mounted on the plate, a crank disk secured to one end of the longitudinal shaft and seated in the enlargement, a connection between said crank disk and movable cutting element, an operating lever having its lower end forked and pivotally mounted on the axle, a quadrant pivotally mounted on the casing and passing through a slot in the handle, means extending through the handle and engaging the quadrant for holding the handle in adjusted position, and means for rotating the longitudinal shaft.

5. In a grass trimmer, a carriage including a casing having a plate extending longitudinally from one end thereof, an axle extending transversely of the casing and supporting the intermediate portion thereof, wheels on the axle, a stationary cutter bar secured to the plate and having its opposite edges transversely rounded and terminating in longitudinally disposed guide fingers, the inner edges of which are inclined rearwardly, a reciprocating cutter bar mounted on the stationary bar, a shaft journaled in the casing, means forming a connection between the reciprocating bar and shaft for imparting movement to the reciprocating bar, and means for rotating said shaft.

6. In a grass trimmer, a carriage comprising a cylindrical casing, a longitudinal shaft journaled in the casing, an axle extending transversely of the intermediate portion of said casing, wheels journaled on the axle, a plate extending longitudinally from the casing at the bottom thereof, a stationary cutting element mounted on the plate and provided with teeth, the opposite edges of the stationary element being extended longitudinally beyond the teeth to form guide fingers, the outer edges of which are curved transversely, a reciprocating cutter bar mounted on the stationary cutting element, a crank disk secured to one end of the shaft and having a spherical head extending laterally therefrom, an operating element pivotally mounted on the plate and having a channel bar receiving the spherical head and provided with spaced fingers fitting in the reciprocating cutting element, the inner edge of the guide fingers being inclined in the direction of the teeth to direct the grass to the reciprocating cutting element, a flexible shaft connected with the opposite end of the longitudinal shaft and leading to a source of power, and an operating handle pivotally mounted on the axle between the casing and said wheels.

ROLLIE B. HITE. [L. S.]